United States Patent
Cheng et al.

[19]

[11] Patent Number: 6,095,302
[45] Date of Patent: Aug. 1, 2000

[54] ONE WAY CLUTCH BEARING

[75] Inventors: Hu Da Cheng; Yin Xiao Wen, both of Wuxi Jiang su, China

[73] Assignee: China Hua Yang Rolling Bearing Co., Wuxi, China

[21] Appl. No.: 09/281,857

[22] Filed: Mar. 31, 1999

[51] Int. Cl.$^7$ .................................................. F16D 11/06
[52] U.S. Cl. .......................................... 192/45; 192/110 B
[58] Field of Search ....................... 192/45, 45.1, 110 B, 192/41 R, 38

[56] References Cited

U.S. PATENT DOCUMENTS

| | | | |
|---|---|---|---|
| 5,074,393 | 12/1991 | Itomi | 192/45 |
| 5,078,243 | 1/1992 | Kanai et al. | 192/45 |
| 5,423,612 | 6/1995 | Zang et al. . | |
| 5,433,305 | 7/1995 | Takamatsu | 192/45 |
| 5,487,608 | 1/1996 | Leuthold et al. . | |
| 5,524,985 | 6/1996 | Dunfield . | |
| 5,540,504 | 7/1996 | Cordova et al. . | |
| 5,580,175 | 12/1996 | Polch et al. . | |
| 5,617,937 | 4/1997 | Zettner et al. | 192/45 |
| 5,695,031 | 12/1997 | Kurita et al. | 192/45 |

*Primary Examiner*—Charles A Marmor
*Assistant Examiner*—Saúl Rodriguez
*Attorney, Agent, or Firm*—Nydegger & Associates

[57] ABSTRACT

A clutch/bearing assembly includes an outer ring having an inner circumference which is formed with an annular groove and a plurality of juxtaposed inclined ramps. The assembly also include an inner ring having an outer circumference which is formed with an annular groove and a juxtaposed flat. An annular frame formed with a plurality of grips is positioned between the inner and outer rings to hold a plurality of ball bearings in the grooves for rotation of the inner ring relative to the outer ring. Also, an annular casing is positioned between the inner and outer rings to hold a plurality of roller bearings between the flat of the inner ring and a respective inclined ramp on the outer ring. Specifically, the casing allows each roller bearing to separate from its respective inclined ramp and thereby permit a unidirectional rotation of the inner ring relative to the outer ring. On the other hand, a counter-rotation of the inner ring compresses each roller bearing between the flat and an inclined ramp to prevent the counter-rotation of the inner ring relative to the outer ring.

20 Claims, 2 Drawing Sheets

6,095,302

ONE WAY CLUTCH BEARING

FIELD OF THE INVENTION

The present invention pertains generally to clutch and bearing assemblies. More particularly, the present invention pertains to a combination clutch and bearing assembly which permits one-way free-wheeling rotation while effectively preventing any counter-rotation. The present invention is particularly, but not exclusively, useful as a clutch/bearing mechanism for establishing unidirectional rotation for a rotatable shaft.

BACKGROUND OF THE INVENTION

It is well known that many machines must somehow rely on the controlled rotation of a single drive shaft, or the rotation of a combination of several drive shafts, for their operational functionality. This can mean either that the speed of rotation, the timing, or the duration of a shaft's rotation needs to be controlled. Further, it is also well known, that many specialized machines require the unidirectional rotation of a shaft for proper operation and, would exhibit a significant or catastrophic operational failure if the shaft was ever subjected to a counter-rotation in an opposite direction.

A traditional and somewhat simplistic example of a mechanism for preventing a rotational motion is a pivotal pawl. As is well known, such a pawl when engaged with the teeth of a ratchet wheel can be used to impart or prevent a rotation of the wheel and any shaft attached thereto. As a practical matter, however, a pawl and ratchet wheel may not be suitable for the applications of many modern day machines. This may particularly be the case where high drive shaft rotational speeds, quick responses, and high torsional force transfers are required in a single operation.

For applications where torque needs to be effectively and quickly applied to a drive shaft, it is clear there is a need for some reliable and robust mechanism which can be used to selectively engage a drive motor to a drive shaft. Furthermore, for applications where it is necessary and essential that a drive shaft rotate in only one direction, there is also the need for a reliable and robust mechanism which will prevent an unwanted counter-rotation. For applications, such as the operation of a washing machine or a punch press, where it is typically a requirement that the drive shaft be sequentially rotated in one direction, and intermittently prevented from being counter-rotated in the opposite direction, the problem of obtaining a sustained reliable operation can become complicated. For instance, in addition to the mechanical transfer of variable torsional forces, the system must be stabilized and remain in proper alignment. Stated differently, it is necessary to ensure that the shaft remains properly aligned and is sequentially rotated about the same axis. Accordingly, regardless whether unidirectional shaft rotation is functionally accomplished by a single mechanism or by separate drive and clutch mechanisms, the efficient transfer of torque to a drive shaft with smoothness and precision while maintaining the stability of the rotational axis is an operational prerequisite.

In light of the above, it is an object of the present invention to provide a clutch/bearing mechanism which allows a drive motor to smoothly engage with a drive shaft in order to unidirectionally rotate the drive shaft at high rotational velocities (i.e. high RPM). Another object of the present invention is to provide a clutch/bearing mechanism which ensures a precise high-speed rotation of a drive shaft with minimal noise generation. Yet another object of the present invention is to provide a clutch/bearing mechanism which effectively transfers a high magnitude torque to a drive shaft for unidirectional rotation of the shaft, while simultaneously preventing slippage of the drive shaft in rotation in the opposite direction. Another object of the present invention is to provide a clutch/bearing mechanism which intermittently transfers torque to a rotatable drive shaft while maintaining a proper alignment of the drive shaft's axis or rotation. Still another object of the present invention is to provide a clutch/ bearing mechanism which is effectively easy to operate, relatively simple to manufacture, and comparatively cost effective.

SUMMARY OF THE PREFERRED EMBODIMENTS

A clutch/bearing mechanism in accordance with the present invention includes a bearing assembly which secures and orients a drive shaft for rotation around a substantially fixed rotational axis. Additionally, the clutch/bearing mechanism includes a functionally separate clutch assembly which establishes a unidirectional rotation for the drive shaft. For the present invention, the bearing assembly and the clutch assembly are juxtaposed in a side-by-side arrangement and function in combination as a single unitary operational mechanism. In combination, both assemblies are centered and positioned around the intended axis of rotation.

In detail, the clutch/bearing mechanism of the present invention includes a substantially hollow, cylindrical shaped outer ring which has an inner circumference that is formed with an annular groove. Also formed onto the inner circumference of the outer ring are a plurality of inclined ramps. More specifically, the annular groove extends around the inner circumference of the outer ring, and the plurality of inclined ramps are juxtaposed with the annular groove around the inner circumference. The clutch/bearing mechanism of the present invention also includes a substantially hollow, cylindrical shaped inner ring which has an outer circumference that is formed with an annular groove. Similar to the annular groove on the inner circumference of the outer ring, the annular groove on the outer circumference of the inner ring extends around the inner ring. Juxtaposed with the annular groove on the outer circumference of the inner ring is a flat.

When joined together in combination with each other, the inner ring is positioned inside the outer ring with the inner circumference of the outer ring opposite the outer circumference of the inner ring. In this configuration, both rings are substantially coplanar and are concentric. As so configured, the annular grooves of the inner and outer rings are aligned opposite each other to establish a bearing raceway between the two grooves. Also, the flat is located opposite the plurality of inclined ramps.

In order to hold a plurality of ball bearings in the bearing raceway between the respective annular grooves of the inner and outer rings, the clutch/bearing mechanism of the present invention is provided with an annular frame. This annular frame is formed with a plurality of grips, and each grip is dimensioned to receive and retain one ball bearing therein. As intended for the present invention, the frame is preferably made of an injection molded plastic and is positioned between the inner and outer rings to stabilize the rings as well as to hold the ball bearings between the annular grooves of the respective rings. Thus, the bearing assembly helps to stabilize the clutch/bearing mechanism while facilitating relative rotational motion between the inner ring and the outer ring.

The clutching function for the clutch/bearing mechanism of the present invention is provided by a clutch assembly which includes an annular casing, a plurality of cylindrical shaped roller bearings and a plurality of springs. Specifically, the annular casing is formed with a plurality of radial apertures which extend through the casing and which are dimensioned to receive and retain a single roller bearing and a single spring. In combination, the annular casing is positioned between the inner and outer rings in a manner similar to the positioning of the annular frame between the rings as discussed above. When so positioned, the casing interacts with the flat of the inner ring and with the inclined ramps of the outer ring to create a plurality of compartments. Specifically, each aperture of the casing cooperates with the flat of the inner ring and with a respective inclined ramp on the outer ring to define an individual compartment. Thus, when the annular casing is inserted between the inner and outer rings, a plurality of compartments are established at regular intervals around the mechanism between the two rings.

As intended for the present invention, a roller bearing and a spring are placed in each compartment that is created by the annular casing. Importantly, the spring is positioned to bias the roller bearing against both the flat and the inclined ramp inside the compartment. For the present invention the direction of this bias is in the direction of decreasing taper between the flat and the respective inclined ramp. The annular casing, like the annular frame, is preferably made of an injection molded plastic and, in addition to holding the roller bearings between the flat and a respective inclined ramp, it acts with the annular frame to stabilize the rings.

In operation, the bearing assembly establishes a structural connection between the inner ring and the outer ring of the clutch/bearing mechanism which allows the two rings to rotate about a common axis, relative to each other. As between the two rings, it will be appreciated that without the clutch assembly, the rings could rotate relative to each other in either a direction of rotation or a direction of counter-rotation. The clutch assembly, however, permits rotation only as a unidirectional rotation. Specifically, consider a unidirectional rotation of the outer ring relative to the inner ring (e.g. consider the inner ring to be held stationary). During such a rotation, the differential in forces that are generated on the roller bearings in the clutch assembly will cause the roller bearings to counteract the spring bias. This, in turn, allows the roller bearing to be separated and distanced from the inclined plane. The result is that there is essentially no resistance to a rotational movement of the outer ring relative to the inner ring. On the other hand, when a counter-rotation of the outer ring is attempted, the forces that are generated on the roller bearings in the clutch assembly will cause the roller bearing to wedge between the flat and the inclined ramp. This will then cause the roller bearing to become compressed between these surfaces. The result is that the outer ring can not counter-rotate relative to the inner ring.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
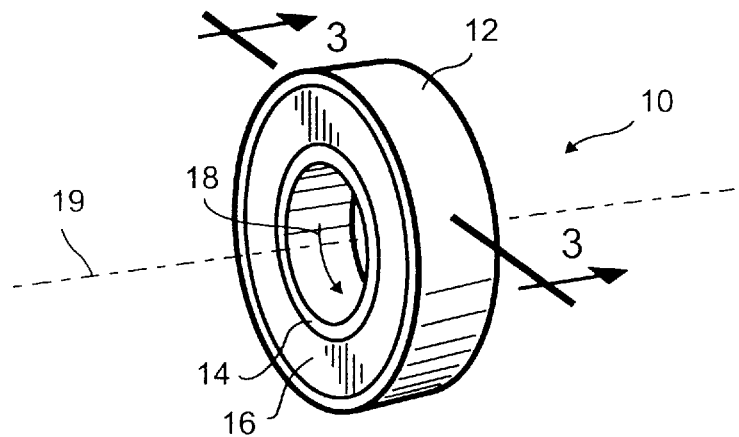
FIG. 1 is a perspective view of the clutch/bearing mechanism of the present invention.

Referring initially to FIG. 1, a clutch/bearing mechanism in accordance with the present invention is shown and is generally designated 10. From the perspective shown in FIG. 1, it can be seen that the mechanism 10 includes an outer ring 12 and an inner ring 14 which are distanced from each other by a casing 16. As intended for the present invention, the outer ring 12 and the inner ring 14 of the mechanism 10 are constrained to rotate relative to each other, in only one direction of rotation. Further, it is intended for the present invention that the mechanism 10 will prevent any relative counter-rotation of the rings 12 and 14 in an opposite direction. Thus, for this disclosure, and for the purposes of describing the cooperation of the interactive components of the mechanism 10, it will be considered that the outer ring 12 is held stationary while the inner ring 14 is rotated relative thereto in the direction of the arrow 18 around an axis of rotation 19. It will be appreciated, however, that the inner ring 14 could just as easily have been considered stationary while the outer ring 12 is rotated. If this were done the outer ring 12 would rotate in a direction opposite to the arrow 18.

Figure 2:
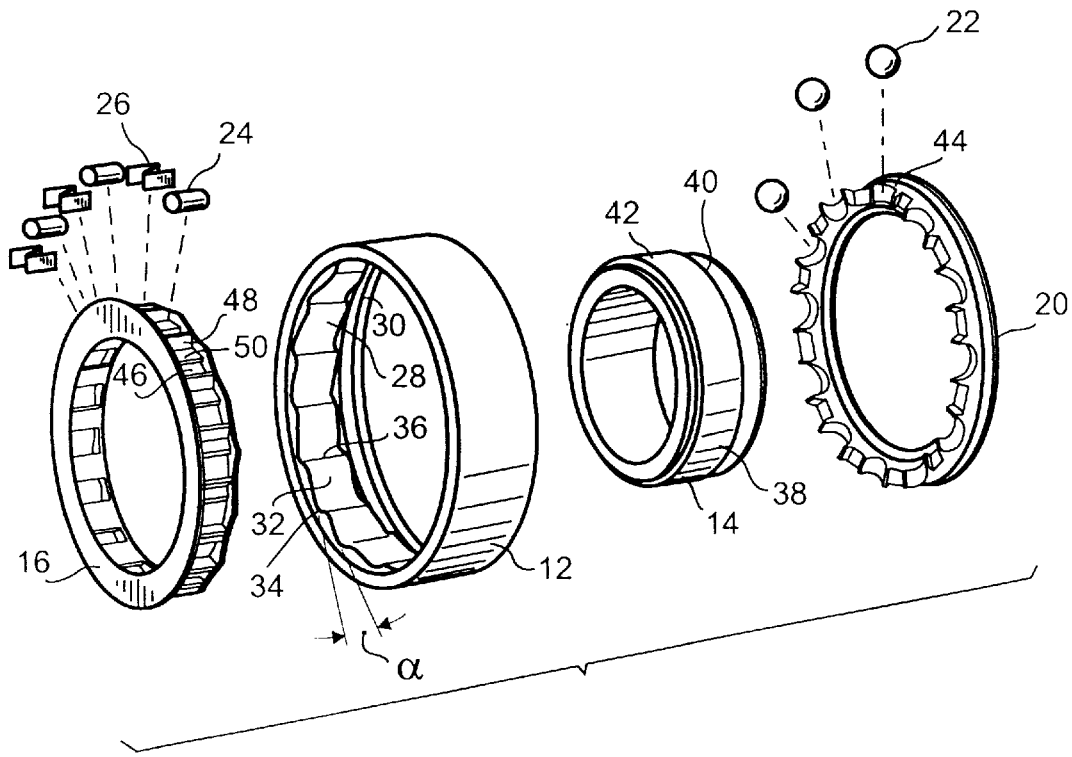
FIG. 2 is an exploded perspective view of the clutch/bearing mechanism of the present invention.

FIG. 2 more clearly shows the detail of the various components which comprise the mechanism 10. Specifically, as shown, in addition to the outer ring 12, the inner ring 14 and the annular casing 16, the mechanism 10 includes an annular frame 20, a plurality of ball bearings 22, a plurality of cylindrical shaped roller bearings 24, and a plurality of compression springs 26. The specific detail for each of these component elements is considered in order, and then in combination.

As shown in FIG. 2 the outer ring 12 is a hollow, substantially cylindrical shaped structure which has an inner circumference 28. As also shown in FIG.. 2, the inner circumference 28 of outer ring 12 is formed with an annular groove 30 which goes completely around the inner circumference 28. Also, the inner circumference 28 of outer ring 12 is formed with a plurality of inclined ramps 32 which are juxtaposed with the annular groove 30. As shown, each of the inclined ramps 32 is bounded and defined by a recess 34 and a projection 36. Specifically, each recess 34 is established by an indentation into the inner circumference 28, and each projection 36 is established by a rise which extends away from the inner circumference 28 substantially as shown. Because the recess 34 of each ramp 32 directly abuts with the projection 34 of an adjacent ramp 32, all of the ramps 32 are inclined in the same general direction. Further, each of the ramps 32 have generally the same inclination angle α and the surface of the ramp 32 between the respective recess 34 and projection 36 is generally planar. For the purposes of the present invention, the outer ring 12 is preferably made of a hard metallic material, such as stainless steel.

The inner ring 14 of the mechanism 10 is shown in FIG. 2 to be a hollow, substantially cylindrical structure having an outer circumference 38. As shown, the outer circumference 38 of inner ring 14 is formed with an annular groove 40 which goes completely around the outer circumference 38. Additionally, the outer circumference 38 of inner ring 14 is formed with an annular flat 42 which also goes completely around the outer circumference 38 and is juxtaposed with the annular groove 40. Like the outer ring 12, the inner ring 14 is preferably made of a hard metallic material, such as stainless steel.

Still referring to FIG. 2, it will be seen that the annular frame 20 of the mechanism 10 is formed with a plurality of grips 44 which are arranged as an annuls on the frame 20. For the mechanism 10, each grip 44 of the frame 20 is dimensioned to hold a ball bearing 22 such that the ball bearing 22 is able to freely rotate in the grip 44. Consequently, an annulus or ring of individual ball bearings 22 is created by the annular frame 20. For the present invention, the annular frame 20 is preferably made of a structurally strong plastic material, and the frame 20 can be manufactured by any method well known in the pertinent art, such as by injection molding.

In FIG. 2, the annular casing 16 is shown to be formed with a plurality of radially oriented apertures 46 which are circumferentially aligned on the casing 16. As shown, these apertures 46 are separated from each other by a back wall 48, and there is a ledge 50 which extends from the back wall 48 into the aperture 46. Specifically, the ledge 50 extends part way across the aperture 46 toward the face 52 on the back wall 48 of an adjacent aperture 46. As intended for the present invention, a roller bearing 24 is placed in each aperture 46 of the annular casing 16. Specifically, each cylindrical shaped roller bearing 24 is oriented in the aperture with its longitudinal axis substantially parallel to the face 52. When so placed, the roller bearing is positioned between the lip 54 of the ledge 50 and the face 52 on the back wall 48 of an adjacent aperture 46. Further, as indicated in FIG. 2, but perhaps better appreciated with reference to either FIG. 3A or FIG. 3B, a spring 26 is positioned in each aperture 46. Specifically, the spring 26 is positioned on the ledge 50 and is compressed between the back wall 48 and the roller bearing 24 to bias the roller bearing toward the face 52.

For the assembly of the clutch/bearing mechanism 10 of the present invention, the inner ring 14 is positioned inside the outer ring 12 so that they are substantially coplanar and concentric with the axis 19. A consequence of this is that the annular groove 30 on the inner circumference 28 of outer ring 14 is positioned over the groove 40 on the outer circumference 38 of the inner ring 14. Together, the grooves 30 and 40 establish a bearing raceway. The positioning of the inner ring 14 inside the outer ring 12 also positions the plurality of inclined ramps 32 on the inner circumference 28 of outer ring 12 so that they are opposite and located over the flat 42 that is formed on the outer circumference 38 on the inner ring 14.

With the rings 12 and 14 positioned to be both coplanar and concentric as disclosed above, an annular frame 20 with a single ball bearing 22 loaded into each of its plurality of grips 44 is inserted between the outer ring 12 and the inner ring 14. Specifically, this positions and holds each of the ball bearings 22 in the raceway that has been created between the grooves 30 and 40. Together, the grooves 30 and 40, and the annular frame 20 with its ball bearings 22 create a bearing assembly for the mechanism 10 which allows for the free rotation of the inner ring 14 relative to the outer ring 12.

A clutch assembly for the clutch/bearing assembly 10 of the present invention is also created with the components disclosed above. Specifically, with a roller bearing 24 and a spring 26 loaded into each of the apertures 46 of the annular casing 16, the casing 16 is inserted between the outer ring 12 and the inner ring 14. This positions and holds each of the roller bearings 24 in a compartment 56 that is created by the casing 16 between the outer ring 12 and the inner ring 14. More specifically, when casing 16 is inserted between ring 12 and ring 14, a plurality of compartments 56 are created with each compartment 56 being bounded by the flat 42 on the outer circumference 38 of inner ring 14, by the respective inclined ramp 32 on inner circumference 28 of outer ring 12, by a back wall 48 and by a face 52. At this point it is to be noted that while the inclined ramps 32 have heretofore been disclosed as being part of the outer ring 12 with the flat 42 being part of the inner ring 14, it is within the contemplation of the present invention that the flat 42 could be on the outer ring 12 and the inclined ramps 32 located on the inner ring 14.

Figure 3A:
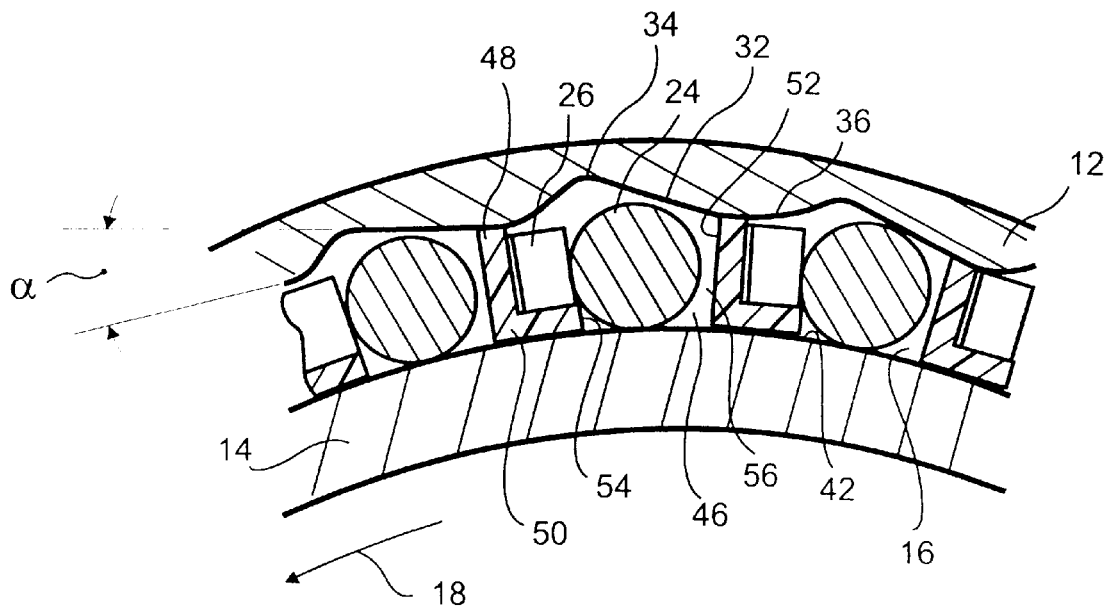
FIG. 3A is a cross sectional view of the clutch assembly of the present invention as seen along the line 3—3 in FIG. 1 under a condition wherein there is allowance for a rotation of the outer ring relative to the inner ring.
Figure 3B:
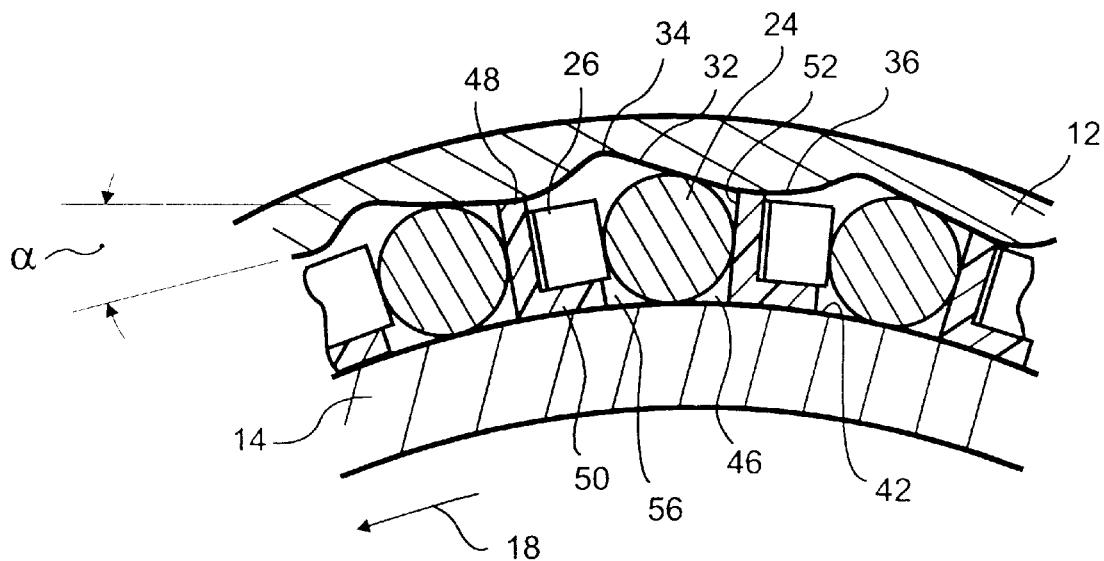
FIG. 3B is a cross sectional view of the clutch assembly of the present invention as seen in FIG. 3A under a condition wherein a counter-rotation of the outer ring relative to the inner ring is prevented.

In the operation of the clutch/bearing mechanism 10 of the present invention, it will be appreciated that the ball bearings 22 that are held by the annular frame 20 between the grooves 20 and 30 allow for a free-wheeling rotation between the outer ring 12 and the inner ring 14. Accordingly, unless there is some counteracting force, there will be a rotation. For example, as shown in FIG. 3A, when there is a rotation of the inner ring 14 in the direction of the arrow 18, the forces which are generated on the roller bearings 24 will tend to counter the force that is generated against the roller bearing 24 by the spring 26. Specifically, as the biasing force that is provided by the spring 26 is overcome, the roller bearing 24 will be distanced and separated from both the face 52 and the inclined ramp 32 in the particular compartment 56. Thus, there is also no interaction of the roller bearing 24 against the flat 42 of the inner ring 14, and the inner ring 14 is free to rotate in the direction of arrow 18. On the other hand, as shown in FIG. 3B, a counter-rotation of the inner ring 14 in a direction opposite to that indicated by arrow 18 will be prevented. This happens because as the inner ring 14 attempts to counter-rotate relative to the outer ring 12, the inner ring 14 will generate forces on the roller bearings 24 which are additive with the biasing forces provided by the springs 26. As shown in FIG. 3B, this causes the roller bearing 24 to be pushed against the face 52 and compressed between the flat 42 and the inclined plane 32. This action, of course, occurs simultaneously in each of the compartments 56. The result is an abrupt cessation of relative rotation between the inner ring 14 and the outer ring 12.

While the particular One Way Clutch Bearing as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A clutch/bearing which comprises:
    a substantially hollow, one piece cylindrical shaped outer ring defining a longitudinal axis and having an inner circumference formed with an annular groove centered on said axis and formed with a plurality of inclined ramps juxtaposed with said annular groove of said outer ring;
    a substantially hollow, one piece cylindrical shaped inner ring having an outer circumference formed with an annular groove and formed with a flat juxtaposed with said annular groove of said inner ring;

an annular frame for holding a plurality of ball bearings between said inner ring and said outer ring and in said annular grooves thereof to facilitate rotation of said inner ring relative to said outer ring; and a means for holding a plurality of roller bearings between said flat of said inner ring and a respective said inclined ramp of said outer ring, to distance said roller bearings from said inclined ramp during a rotation of said inner ring relative to said outer ring, and to compress each said roller bearing between said flat and a respective said inclined ramp to prevent a counter-rotation of said inner ring relative to said outer ring.

2. A clutch/bearing as recited in claim 1 wherein said annular frame is formed with a plurality of grips, each said grip being dimensioned to receive and retain one said ball bearing therein, said frame being positioned between said inner ring and said outer ring to hold said ball bearings for rotation in said annular grooves.

3. A clutch/bearing as recited in claim 1 wherein said means for holding roller bearings is an annular casing formed with a plurality of apertures extending radially therethrough, each said aperture being dimensioned to receive and retain one said roller bearing therein, said casing being positioned between said inner ring and said outer ring to hold said roller bearings for rotation between said flat of said inner ring and a respective said inclined ramp of said outer ring.

4. A clutch/bearing as recited in claim 3 wherein said casing further comprises:

a plurality of ledges with each said ledge extending circumferentially into a respective said aperture; and a plurality of springs, with each said spring being positioned on a respective said ledge and biased to exert a force on a respective said roller bearing to thereby urge said roller bearing against a respective said inclined ramp.

5. A clutch/bearing as recited in claim 4 wherein each said roller bearing is cylindrical in shape.

6. A clutch/bearing as recited in claim 5 wherein said annular frame and said annular casing are made of a plastic material.

7. A clutch/bearing as recited in claim 6 wherein said inner ring and said outer ring are made of stainless steel.

8. A clutch/bearing which comprises:

a bearing assembly including a one-piece outer ring having an annular groove and a one-piece inner ring having an annular groove and an annular frame, said groove of said outer ring being substantially concentric and coplanar with said groove of said inner ring to establish a raceway therebetween, said raceway being positioned to receive at least one ball bearing therein, said raceway and said annular frame to hold said ball bearing and to permit relative rotational motion between said inner ring and said outer ring; and a clutch assembly having at least one compartment, said compartment being established between a flat formed on one said ring and a ramp formed on said other ring, said ramp being inclined relative to said flat to taper said compartment between said inner ring and said outer ring with diminishing distance between said ramp and said flat in a circumferential direction, said clutch assembly further including a roller bearing positioned in said compartment and a biasing means for urging said roller bearing in said circumferential direction to thereby assist compression of said roller bearing between said ramp and said flat in opposition to a rotation of said inner ring relative to said outer ring in said circumferential direction.

9. A clutch/bearing as recited in claim 8 wherein said flat is on said inner ring and said ramp is on said outer ring.

10. A clutch/bearing as recited in claim 8 wherein there are a plurality of said compartments, said plurality of compartments being arranged as an annulus in juxtaposition with said annular raceways.

11. A clutch/bearing as recited in claim 8 wherein said compartment is dimensioned to distance said roller bearing from said ramp and thereby facilitate a counter-rotation of said inner ring relative to said outer ring in an opposite circumferential direction.

12. A clutch/bearing as recited in claim 8 wherein there are a plurality of ball bearings and said annular frame is formed with a plurality of grips, each said grip being dimensioned to receive and retain one said ball bearing therein, said frame being insertable between said inner ring and said outer ring to hold said ball bearings for rotation in said annular grooves.

13. A clutch/bearing as recited in claim 12 wherein there are a plurality of roller bearings and said clutch/bearing further comprises an annular casing formed with a plurality of apertures extending radially therethrough, each said aperture defining one said compartment and being dimensioned to receive and retain one said roller bearing therein, said casing being insertable between said inner ring and said outer ring to hold said roller bearing for rotation in a respective said compartment.

14. A clutch/bearing as recited in claim 13 wherein said casing further comprises a plurality of ledges, with each said ledge extending circumferentially into a respective said aperture, and wherein said biasing means is a plurality of springs, with each said spring being positioned on a respective said ledge to exert a force on a respective said roller bearing and thereby urge said roller bearing against a respective said inclined ramp.

15. A clutch/bearing as recited in claim 14 wherein each said roller bearing is cylindrical in shape.

16. A clutch/bearing as recited in claim 15 wherein said annular frame and said annular casing are made of a plastic material.

17. A clutch/bearing as recited in claim 16 wherein said inner ring and said outer ring are made of stainless steel.

18. A method for using a clutch/bearing which comprises the steps of:

providing a substantially hollow cylindrical shaped one-piece outer ring defining a longitudinal axis and having an inner circumference formed with an annular groove centered on said axis and formed with a plurality of inclined ramps juxtaposed with said annular groove of said outer ring, and a substantially hollow cylindrical shaped one-piece inner ring having an outer circumference formed with an annular groove and formed with a flat juxtaposed with said annular groove of said inner ring;

providing an annular frame to hold a plurality of ball bearings in said annular groove of said inner ring and in said annular groove of said outer ring and between said inner ring and said outer ring to facilitate rotation of said inner ring relative to said outer ring; and holding each of a plurality of roller bearings between said flat of said inner ring and a respective said inclined ramp of said outer ring, to distance each said roller bearing from said inclined ramp to permit a rotation of said inner ring relative to said outer ring, and to compress each said roller between said flat and a respective said inclined ramp to prevent a counter-rotation of said inner ring relative to said outer ring.

19. A method as recited in claim 18 wherein said annular frame is formed with a plurality of grips, each said grip being dimensioned to receive and retain one said ball bearing therein, said frame being insertable between said inner ring and said outer ring to hold said ball bearings for rotation in said annular grooves.

20. A method as recited in claim 19 wherein said step of holding roller bearings is accomplished using an annular casing formed with a plurality of aperture extending radially therethrough, each said aperture being dimensioned to receive and retain one said roller bearing therein, said casing being insertable between said inner ring and said outer ring to hold said roller bearing for rotation between said flat of said inner ring and a respective said inclined ramp of said outer ring.

* * * * *